US 7,804,661 B2

(12) United States Patent
Wilcox et al.

(10) Patent No.: US 7,804,661 B2
(45) Date of Patent: Sep. 28, 2010

(54) MICROACTUATOR CONTROL THAT AVOIDS THERMAL ASPERITIES ON DISK SURFACES

(75) Inventors: Lawrence Allen Wilcox, Shakopee, MN (US); Andrew Robert Motzko, Delano, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/325,563

(22) Filed: Dec. 1, 2008

(65) Prior Publication Data

US 2010/0134919 A1    Jun. 3, 2010

(51) Int. Cl.
G11B 21/02    (2006.01)
G11B 5/596    (2006.01)
(52) U.S. Cl. ..................... 360/75; 360/77.07
(58) Field of Classification Search ........... None
See application file for complete search history.

(56) References Cited

U.S. PATENT DOCUMENTS

| 4,924,331 | A | | 5/1990 | Robinson et al. |
| 5,796,546 | A | | 8/1998 | Sasamoto et al. |
| 5,844,920 | A | * | 12/1998 | Zook et al. ............. 714/769 |
| 5,901,010 | A | * | 5/1999 | Glover et al. ........... 360/78.12 |
| 6,097,559 | A | * | 8/2000 | Ottesen et al. ............. 360/31 |
| 6,314,814 | B1 | * | 11/2001 | Brannon et al. ............. 73/705 |
| 6,442,715 | B1 | | 8/2002 | Wilson |
| 6,868,477 | B2 | | 3/2005 | Hoskins et al. |
| 6,925,580 | B2 | | 8/2005 | Hoskins |
| 6,963,464 | B2 | * | 11/2005 | Xu et al. ................. 360/75 |
| 7,426,090 | B2 | * | 9/2008 | Yamashita et al. ........... 360/75 |
| 7,457,069 | B2 | * | 11/2008 | Yoshioka et al. ............ 360/75 |
| 2006/0227452 | A1 | | 10/2006 | Khurshudov et al. |

* cited by examiner

*Primary Examiner*—K. Wong

(57) ABSTRACT

While a microactuator is controlled to cause a head to follow a track on a disk surface, one or more other microactuators are separately controlled to offset other heads away from locations of thermal asperities on other associated disk surfaces.

19 Claims, 5 Drawing Sheets

| Thermal Asperity Location Table 700 | | |
|---|---|---|
| Disk Surface ID | Track ID | Sector ID |
| 1 | aaa | xxx |
| 2 | aaa | xxy |
| 3 | aaa | xxz |
| 4 | bbb | xyx |
| 5 | bbb | xyy |
| 6 | bbb | xyz |

MICROACTUATOR CONTROL THAT AVOIDS THERMAL ASPERITIES ON DISK SURFACES

BACKGROUND

The present invention generally relates to controlling head movement and, more particularly, to controlling head movement within a servo control loop.

Hard disk drives contain a plurality of magnetic heads that are coupled to surfaces of rotating disks. The heads can magnetize and sense the magnetic fields of the disk surfaces to write and read data, respectively. The heads each have an air bearing surface that cooperates with a flow of air generated by the rotating disks to create an air bearing to avoid contact with the adjacent disk surfaces. The air bearing therefore reduces mechanical wear between the heads and the disk surfaces.

The data is typically stored on annular tracks that extend radially across each disk surface. To access data in different tracks, the drive moves the heads across the disk surfaces in accordance with a seek routine.

The surfaces of the disks may have protrusions caused by, for example, disk defects or contaminants embedded into or residing on the disk surface. Impact between the heads and the protrusion may create heat that degrades the read back signal. This phenomenon is referred to as a thermal asperity. Additionally, such impact may create an instability in the air bearing and cause erroneous reading or writing of data on the affected disk surface. For these or other reasons, some disk drives are configured to avoid reading or writing data on tracks that are known to contain thermal asperities.

SUMMARY

While a microactuator is controlled to cause a head to follow a track on a disk surface, one or more other microactuators are separately controlled to offset other heads away from locations of thermal asperities on other associated disk surfaces.

In some embodiments, a circuit includes a controller that controls a first microactuator to cause a first head to follow a track on a first disk surface while controlling a second microactuator to conditionally offset a second head away from a track on a second disk surface responsive to data that identifies locations of thermal asperities on the second disk surface.

In some other embodiments, a circuit includes a memory storing thermal asperity data that identifies sectors of tracks on a disk surface that contain thermal asperities.

In some other embodiments, a first microactuator is controlled to cause a first head to follow a track on a first disk surface while a second microactuator is controlled to conditionally offset a second head away from a track on a second disk surface responsive to data that identifies locations of thermal asperities on the second disk surface.

DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Figure 1:
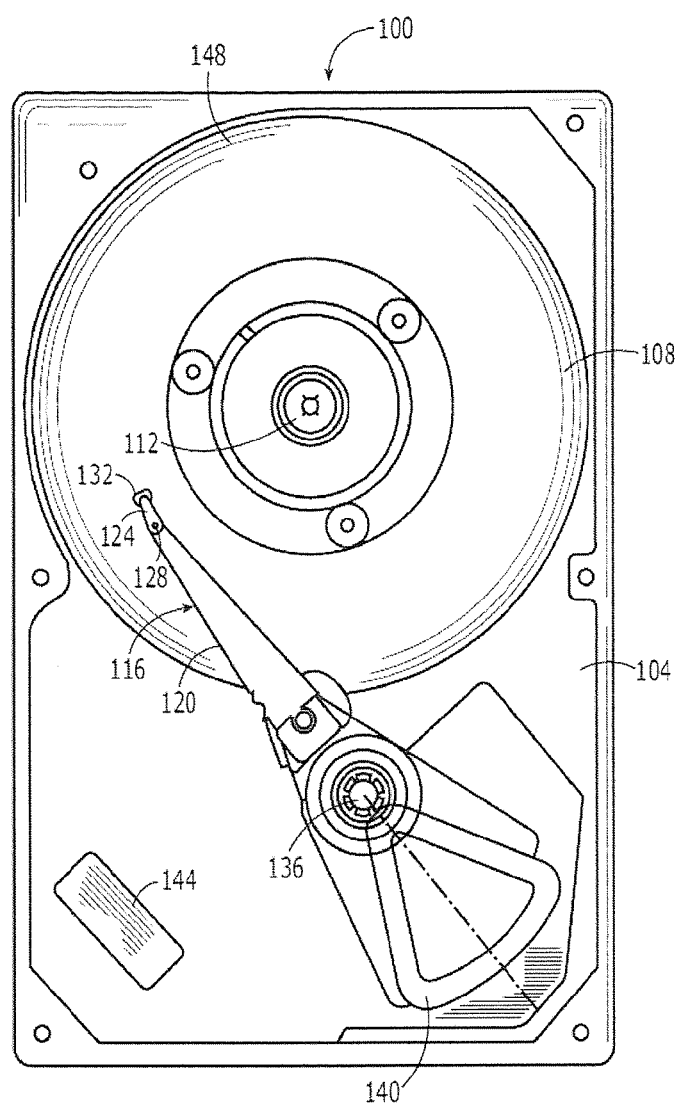
FIG. 1 is a block diagram of a disk drive having dual actuators and a controller that is configured to control microactuators to avoid thermal asperities on disk surfaces according to some embodiments of the present invention.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

It will be understood that, although the terms first, second, etc. may be used herein to describe various elements, these elements should not be limited by these terms. These terms are only used to distinguish one element from another. For example, a first region/element/value could be termed a second region/element/value, and, similarly, a second region/element/value could be termed a first region/element/value without departing from the teachings of the disclosure.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium that is executable by a processor to perform functionality described herein. Accordingly, as used herein, the terms "controller," "circuit," and "module" may take the form of digital circuitry, such as a logical gate array and/or computer-readable program code executed by a processor (e.g., general purpose microprocessor and/or digital signal processor), and/or may take the form of analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of disk drives for purposes of illustration and explanation only, the present invention is not limited thereto. It is to be understood that the present invention can be more broadly used for any type of servo control loop that uses a microactuator to position a head relative to a disk surface.

FIG. 1 illustrates a computer disk drive 100 with a dual stage actuator. The disk drive 100 includes a base 104 and one or more data storage disks 108 (only one of which is shown in FIG. 1). The disk 108 may be a magnetic disk, an optical disk, or any other type of data storage disk, and which may have data storage tracks defined on one or both of its storage surfaces. The disk 108 is interconnected to the base 104 by a spindle motor (not shown) mounted within or beneath the hub 112, such that the disk 108 can be rotated relative to the base 104.

An actuator arm assembly 116 includes a first member 120 and a second member 124. The first member 120 is coupled between the base 104 and the second member 124, and the members 120 and 124 can provide two stages of movement. Interconnecting the first stage 120 and the second stage 124 of the actuator arm assembly 116 is a microactuator 128. A head 132 (or "transducer") is mounted on a distal portion of the actuator arm assembly 116. In particular, the head 132 can be coupled to an end of the second member 124 of the actuator arm assembly 116 so that it can be positioned adjacent to a storage surface of the disk 108. Although only one actuator arm assembly 116 is shown in FIG. 1, it is to be understood that a plurality of the actuator arm assemblies 116 are interconnected and configured to position other heads adjacent to respective data storage surfaces of a stack of the disks 108.

The first member 120 of the actuator arm assembly 116 can be interconnected to the base 104 by a bearing 136. A coarse actuator 140 can pivot the actuator arm assembly 116 about the bearing 136 to position the microactuator 128 and, thereby, position the head 132 with respect to the disk 108. In particular, the coarse actuator 140 positions the head 132 to allow it to access different data tracks or cylinders 148 on the disk 108. The coarse actuator 140 is configured to position the microactuator 128 and, thereby, the head 132 over a first range of movement that may correspond to the distance between an inner and outer diameter of the storage surface of the disk 108. The coarse actuator 140 may be, for example, a motor such as a voice coil motor (VCM).

The articulation of the second member 124 with respect to the first member 120 of the actuator arm assembly 116 may be achieved by, for example, providing a journal bearing as part of the microactuator 128, by providing a flexible interconnection between the second member 124 and the first member 120, or by otherwise joining the second member 124 to the first member 120 in such a way that the second member 124 is allowed to move with respect to the first member 120.

The microactuator 128 is configured to position the head 132 relative to the disk 108 over a second range of movement that is less than the first range of movement provided by the coarse actuator 140. The microactuator 128 may affect finer positioning and/or higher frequency movements of the heads 132 within its range of movement (e.g., over relatively short distances), such as that which may be encountered during short seeks (e.g., a few tracks) or during track following, compared to the coarse actuator 140. The microactuator 128 may also be utilized during the settle phase of long seeks when the distance between the head 132 and the target track is within the motion range of the microactuator to reduce settle time. The microactuator 128 may be any mechanism capable of moving the head 132 relative to the disk 108, such as by adjusting the relative position of the second member 124 with respect to the first member 120. For example, the microactuator 128 may be a piezoelectric actuator, an electromagnetic actuator, or an electrostatic actuator. Accordingly, the microactuator 128 may move the head 132 faster across the disk 108, within its range of movement, than may be possible with the coarse actuator 140.

Figure 2:
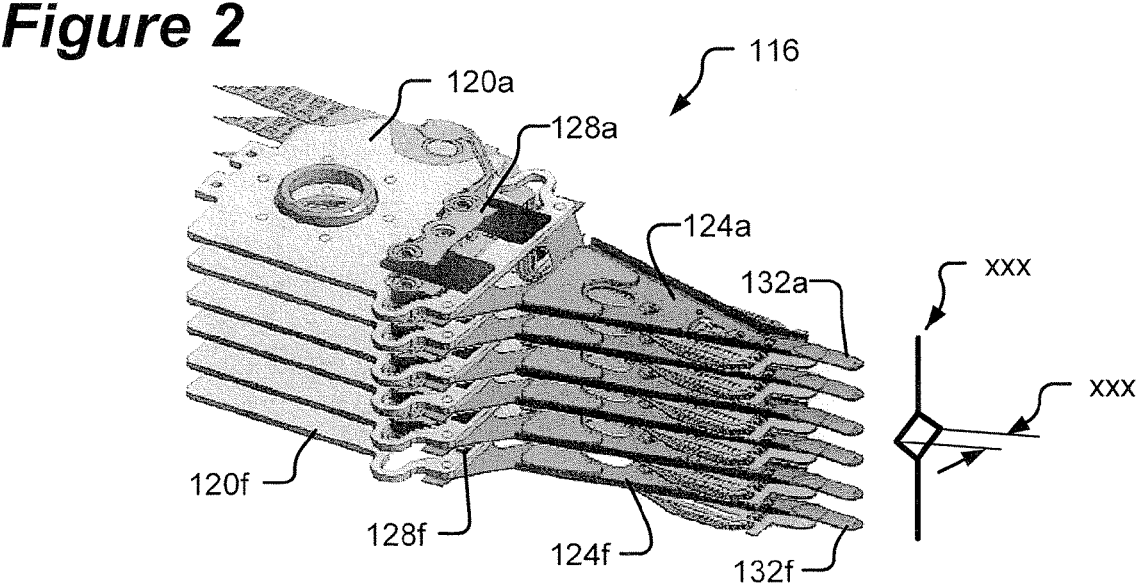
FIG. 2 illustrates an actuator assembly including a plurality of heads that are positioned to radially offset one or more heads to avoid contact between the heads and thermal asperities along tracks on disk surfaces according to some embodiments of the present invention.

FIG. 2 further illustrates an exemplary embodiment of the actuator assembly 116 that includes a plurality of heads 132 that are each connected to different ones of the second members 124. A plurality of microactuators 128 are each mounted on and interconnect different pairs of the first and second members 120 and 124, and are configured to move the heads 132 (FIG. 1) radially across the adjacent disk surfaces. For example, the exemplary actuator assembly 116 shown in FIG. 2 includes six pairs of first and second members 120a-f and 124a-f, six heads 132a-f, and six microactuators 128a-f that are configured to move the heads 132a-f. Although the exemplary embodiment of FIG. 2 illustrates six pairs of members 120a-f and 124a-f, heads 132a-f, and microactuators 128a-f for purposes of illustration and explanation only, the invention is not limited thereto and may be used to position any plural number of heads.

The controller 144 is configured to control movement of the heads 132a-f relative to the disks 108 (e.g., three disks collectively having six data storage surfaces) via the coarse actuator 140 and the plurality of microactuators 128a-f. The controller 144 moves the heads 132a-f in two primary modes: a seek mode and a track following mode. During the seek mode, the controller 144 can be configured to move the heads 132a-f from an initial track to a target track for which the host device has requested access using the coarse actuator 140, the microactuators 128a-f, and/or a combination thereof. During track following, the controller 144 may simultaneously control both the coarse actuator 140 and a selected one of the microactuators 128a-f, but may primarily rely upon movement of the selected one of the microactuators 128a-f to maintain a corresponding one of the heads 132a-f aligned with a target track while reading/writing data on the target track.

In accordance with some embodiments, the controller 144 is configured to separately control positioning of the heads 132a-f to cause a selected one of the heads 132a-f to follow a target track on a disk surface, such as while reading/writing data on the target track, and to offset one or more of the other heads 132a-f away from radial locations on other disk surfaces in response to data that identifies locations of thermal asperities on the other disk surfaces.

Figure 3:
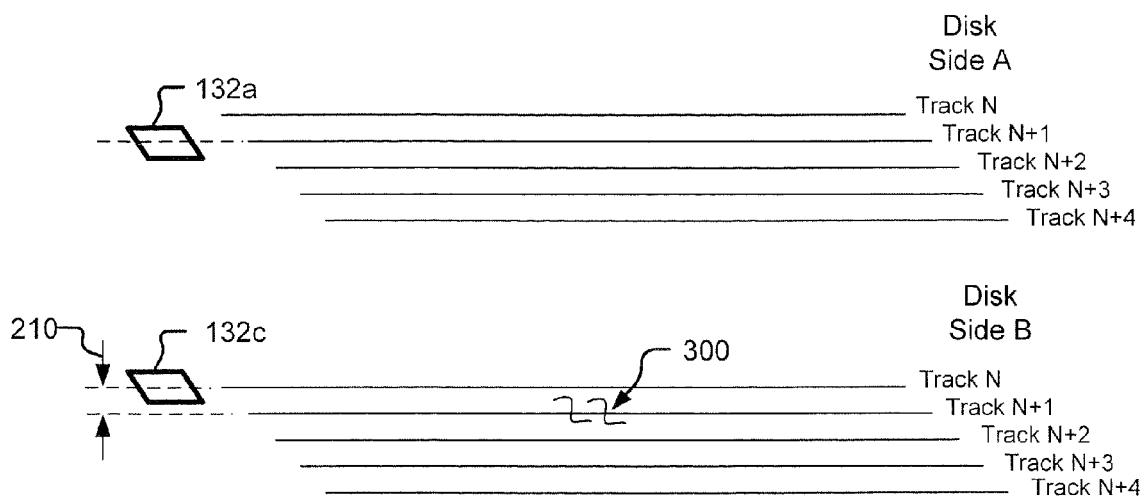
FIG. 3 illustrates a first head that is aligned with a track on a first disk surface and a second head that is radially offset relative to a corresponding track on a second disk surface.

Exemplary operation of the controller 144 controlling the microactuators 128a-f will now be described with regard to FIGS. 2 and 3. FIG. 3 illustrates a plurality of tracks on two disk surfaces (side A and side B). The exemplary disk surfaces may be located on opposite sides of the same disk or may be located on different disks. While reading/writing data through the head 132a on a target track N+1, corresponding to the radial location 200 on the disk surface (side B), the controller 144 also allows the heads 132b and 132d-f to be located at the radial location 200 of the track N+1 on the associated disk surfaces.

However, the disk surface (side B) on which the head 132c reads/writes contains thermal asperities 300 (one of which is shown in FIG. 3 along track N+1) that may collide with the head 132c. If the head 132c were aligned with track N+1 on side A while the other head 132a is following track N+1 on side B, it may collide with the thermal asperities 300. In order to avoid such collision, the controller 144 responds to data that identifies the locations of the thermal asperities 300 on side B by offsetting the head 128c away from the track N+1.

Thus, for example, the controller 144 can control the microactuators 128c to offset the head 128c a radial distance 210 that may be sufficient to avoid collision with the thermal asperities 300. The radial offset distance 210 may, for example, corresponding to at least one radial track spacing away from the thermal asperities 300 (e.g., offset to at least track N), although the radial offset distance 210 may be up to a maximum radial offset distance that can be obtained through control of the associated microactuator 128c (e.g. a maximum/saturated range of movement obtainable through the microactuator 128c).

While the other head 132a is reading/writing along track N+1, the controller 144 may maintain the head 132c offset from the entire track N+1 because of the data indicating presence of asperities 300 along track N+1. Alternatively, the data may identify sectors of tracks on the disk surface to contain the thermal asperities 300. The controller 144 may be configured to respond to the data by dynamically controlling the microactuator 128c to conditionally offset the head 132c away from the identified sectors of the track N+1 that are known to contain asperities 300, thereby avoiding contact between the head 132c and the thermal asperities 300. The controller 144 may cease controlling the microactuator 128c while the head 132c is within other sectors that do not contain known asperities 300, or it may actively control the microactuator 128c to can cause the head 132c to at least partially overlap the track N+1 within the sectors that do not contain known asperities 300. Actively controlling the head 132c to follow the track N+1 during sectors that do not contain known asperities 300, while the other head 132a is reading writing from track N+1 on another disk surface, may allow the disk drive to more rapidly switch to reading/writing data on the corresponding disk surface through the head 132c.

It is to be understood that each of the non-selected heads 132b-f can be independently offset relative to track N+1 responsive to data that indicates the locations of thermal asperities on the corresponding disk surfaces while the head 132a is reading/writing data on track N+1 of its corresponding disk surface. Some of the non-selected heads 132b-f may be moved in one radial direction (e.g. toward an inner diameter of the disks) to avoid known thermal asperities along track N+1 on their associated disk surfaces, some other of the non-selected heads 132b-f may be moved in an opposite radial direction (e.g. toward an outer diameter of the disks) to avoid known thermal asperities along track N+1 on their associated disk surfaces, and still some other of the non-selected heads 132b-f may not be offset when no known thermal asperities are present along track N+1 of their associated disk surfaces. It is to be understood that the non-selected heads 132b-f can be moved in either radial direction, with the particular direction of movement for a particular one of the heads 132b-f being selected to be away from the known locations of thermal asperities of the adjacent disk surfaces. Because thermal asperities on the disk surfaces may extend across a plurality of tracks, the controller 144 may independently offset the heads in directions away from known asperities that are within a threshold distance of those heads, so as to decrease the likelihood that the heads will contact the thermal asperities.

Figure 4:
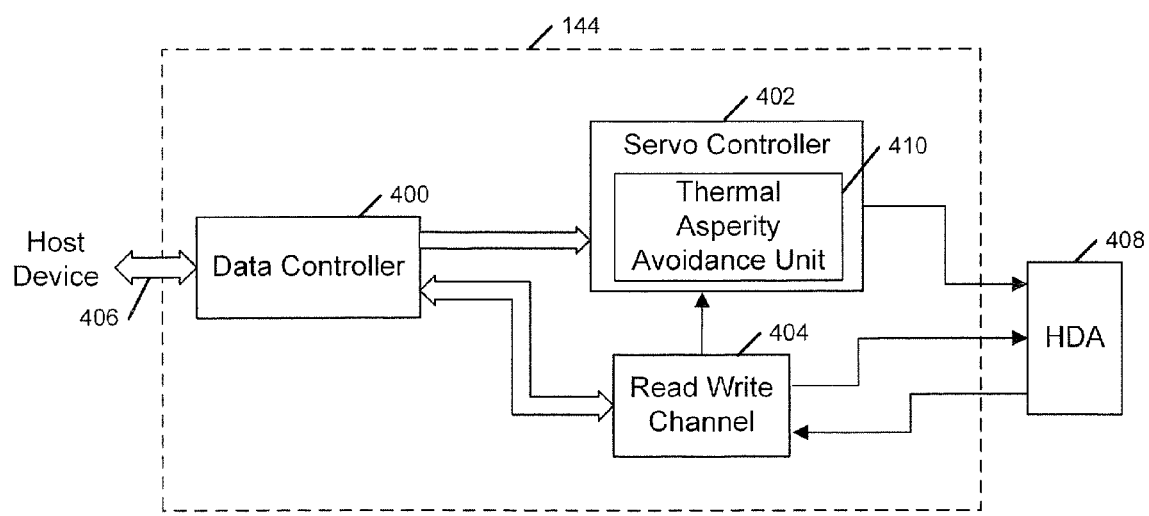
FIG. 4 is a block diagram of a servo controller in accordance with some embodiments of the present invention.

Referring to FIG. 4, the controller 144 can include a data controller 400, a servo controller 402, and a read/write channel 404. The exemplary embodiment of the controller 144 has been illustrated with components that include two separate controllers 400 and 402 and the read/write channel 404 for purposes of illustration and discussion only. It is to be understood that the functionality that is described herein for these components may be consolidated in fewer components or distributed among more components.

The controller 144 is configured to respond to read and write instructions via a communication link 406 from a host device by reading and writing data on a head disk assembly (HDA) 408 that may be configured as shown in FIGS. 1 and/or 2. The HDA 408 can include the actuator arm assembly 116, the disk stack 108, the microactuators 128a-f, the coarse actuator 140, and the spindle motor. The read/write channel 404 can operate in a conventional manner to convert data between the digital form used by the data controller 400 and the analog form conducted through the heads 132a-f in the HDA 408. The read/write channel 404 provides servo positional information read from the HDA 408 to the servo controller 402. The servo positional information can be used to detect the radial and circumferential location of the heads 132a-f in relation to tracks and block addresses on the disks 108. The servo controller 402 can use the servo positional information to seek the heads 132a-f to a target (e.g., host addressed) track and block on the disks 108, and to maintain the heads 132a-f aligned with the target track while data is written/read on the disks 108.

The servo controller 402 includes a thermal asperity avoidance unit 410 that can control the microactuators 128a-f to conditionally offset particular ones of the heads 132a-f away from entire tracks and/or particular sectors of tracks on the corresponding disk surfaces that are identified by data as having known thermal asperities thereon.

Figure 5:
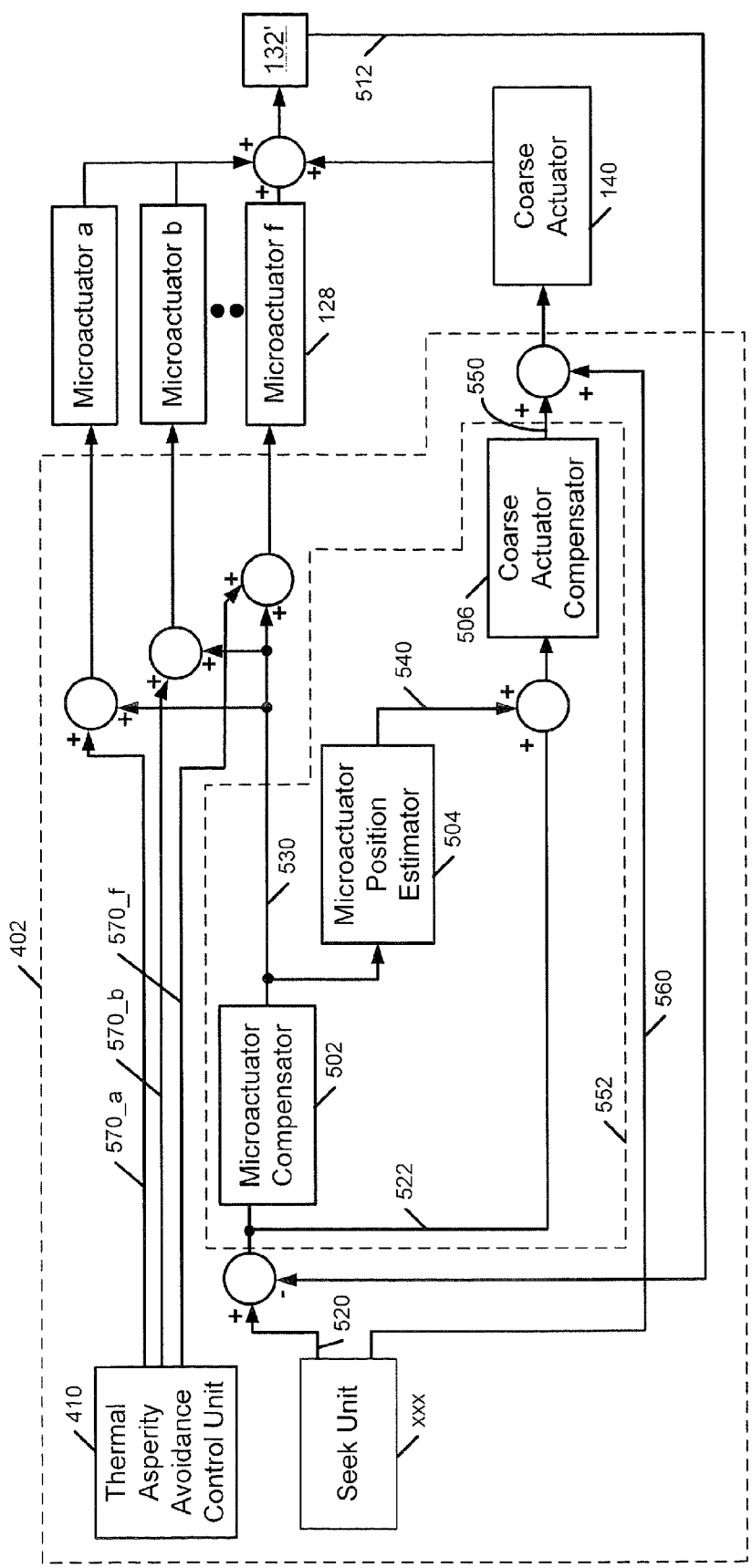
FIG. 5 is a block diagram of a control loop of the servo controller in accordance with some embodiments of the present invention.

FIG. 5 is a block diagram of a control loop of the servo controller 402 that is configured in accordance with some embodiments of the present invention. Referring to FIG. 5, the exemplary servo controller 402 includes a microactuator compensator 502, a microactuator position estimator 504, and a coarse actuator compensator 506. The microactuator compensator 502, the microactuator position estimator 504, and the coarse actuator compensator 506 are also collectively referred to herein as a dual-stage controller 552. The servo controller 402 may be embodied as analog/digital circuitry (e.g., software executed on a microprocessor).

The position of the heads 132a-f relative to tracks depends on a summation of the positioning contributions from the microactuators 128a-f and the coarse actuator 140. The servo controller 402 senses the position of a selected one of the heads 132' based on servo information that is read from the corresponding one of the disks 108 to generate a sensed position signal 512. The sensed position signal 512 is fedback to a summation node where it is combined with a desired position reference signal 520 to generate a position error signal 522. During a track following mode, the position reference signal 20 may be a DC value, such as zero, to drive the selected head 132' toward a centerline of the target track.

The microactuator compensator 502 is configured to control movement of the microactuators 128a-f based on the position error signal 522. For example, the microactuator compensator 502 generates a microactuator control signal 530 that compensates for high frequency components of the position error signal 522. The microactuators 128a-f can then effect high frequency movements of the selected head 132' within its range of movement based on the control signal 530. The microactuator position estimator 504 estimates the position of the selected microactuator 128, which positions the selected head 132', in its range of movement and generates an estimated microactuator position signal 540. The estimated microactuator position signal 540 is combined at a summing node with the position error signal 522 and provided to the coarse actuator compensator 506.

The coarse actuator compensator 506 controls movement of the coarse actuator 140, via a coarse actuator control signal 550, based on the estimated microactuator position signal 540 and based on the position error signal 522. Accordingly, the response of the coarse actuator compensator 506 takes into account an estimate of the response of the selected microactuator 128 to the position error signal 522.

The thermal asperity avoidance unit 410 responds to data that indicates the location of known thermal asperities on disk surfaces by separately controlling the microactuators 128a-f to avoid collisions between the connected heads and the thermal asperities. More particularly, the thermal asperity avoidance unit 410 generates feed-forward signals 510a-f responsive to the thermal asperity location data. The microactuator control signal 530 is split into parallel signals which are separately combined with respective ones of the feed-forward signals 510a-f and supplied to respective ones of the microactuators 128a-f to bias the associated heads away from the radial locations of known asperities. By way of example, while the microactuator compensator 502 maintains a head that is connected to microactuator 128a aligned with a desired track while reading/writing data, the thermal asperity avoidance control unit 410 separately biases the other microactuators 128b-f away from radial locations of known asperities.

Figures 6, 7:
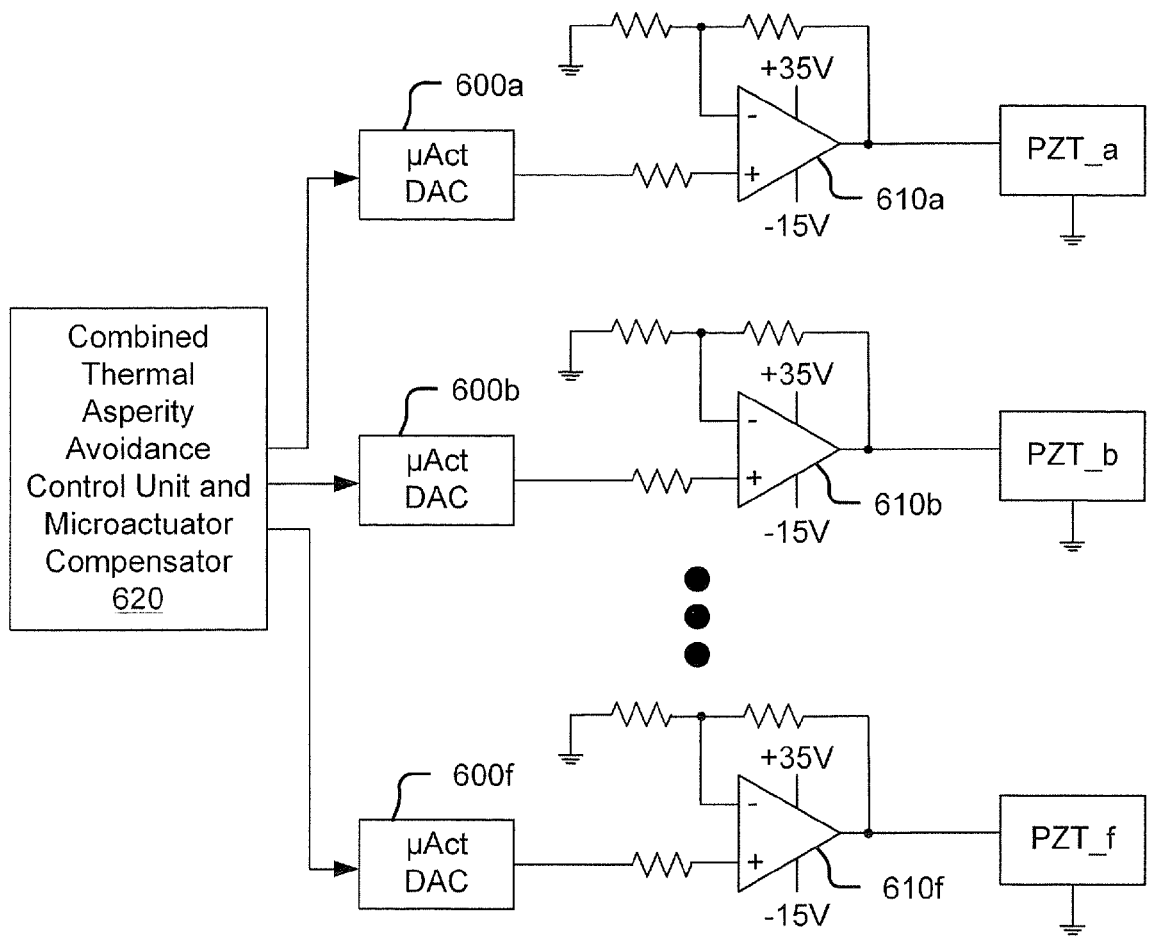
FIG. 6 is a circuit diagram of parallel circuits that condition microactuator control signals to enable separate control of a plurality of piezoelectric microactuators that position heads in accordance with some embodiments of the present invention.
FIG. 7 illustrates a table of data in a memory that may be used by a servo controller to determine the locations of thermal asperities on disk surfaces by track identifiers and sector identifiers.

FIG. 6 is a diagram of parallel circuits that condition microactuator control signals to enable separate control of microactuators that position heads in accordance with some embodiments of the present invention. Referring to FIG. 6, the circuit includes a combined thermal asperity avoidance control unit and microactuator compensator circuit 620, piezoelectric microactuators PZT_a-PZT_f, digital-to-analog converters (DACs) 600a-f, and amplifiers 610a-f. The combined circuit 620 generates separate digital control signals in response to data that indicates the known location of thermal asperities on disk surfaces (e.g., to separately move the heads to avoid thermal asperities on the associated disks). The separate digital control signals are supplied to parallel circuit combinations of the DACs 600a-f, the amplifiers 610a-f, and the piezoelectric microactuators PZT_a-PZT_f. The DACs 600a-f convert the digital control signals into analog control signals. The amplifiers 610a-f generate amplified analog control signals that are supplied to the piezoelectric microactuators PZT_a-PZT_f.

FIG. 7 illustrates a memory table 700 of data that may be used by a microactuator control circuit (e.g., the thermal asperity avoidance control unit 410), such as to determine the locations of thermal asperities on disk surfaces by track identifiers and sector identifiers. Referring to FIG. 7, the exemplary memory table 700 identifies six different disk surfaces and identifies corresponding track identifiers and sector identifiers where thermal asperities are known to occur. Thus, for example, on disk surface 1 thermal asperities are known to occur in sector "xxx" of track "aaa", on disk surface 2 thermal asperities are known to occur in sector "xxy" of track "aaa", and so on to disk surface 6 where thermal asperities are known to occur in sector "xyz" of track "bbb". It is to be understood that although the exemplary memory table 700 indicates that a single thermal asperity is located in a single sector of a single track on each of the disk surfaces, the memory table 700 is not limited thereto. Instead, any number of thermal asperities on any number of sectors, tracks, and disk surfaces may be identified in the memory table 700.

Figure 8:
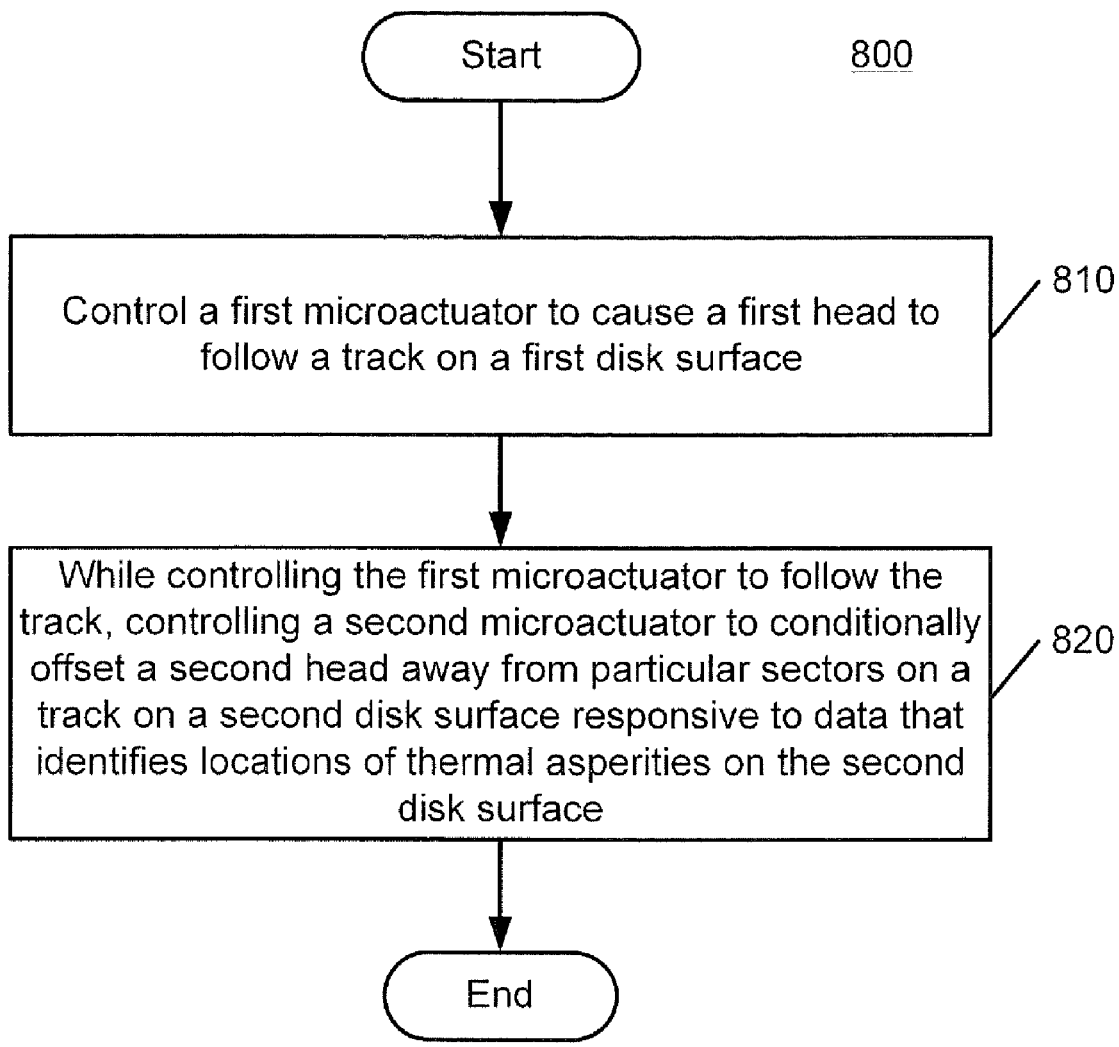
FIG. 8 is a flowchart illustrating operations for positioning heads to avoid contact with thermal asperities on disk surfaces according to some embodiments of the present invention.

FIG. 8 is a flowchart that illustrates exemplary operations 800 for controlling microactuators to offset heads away from radial locations on disk surfaces having known thermal asperities. Referring to FIG. 8, a first microactuator is controlled (block 810) to cause a first head to follow a track on a first disk surface. While the first microactuator is controlled so that the head follows the track, a second microactuator is controlled (block 820) to conditionally offset a second head away from particular sectors on a track on a second disk surface responsive to data that identifies locations of thermal asperities on the second disk surface.

The foregoing discussion of the invention has been presented for purposes of illustration and description. Further, the description is not intended to limit the invention to the form disclosed herein. Consequently, variations and modifications commensurate with the above teachings are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments.

What is claimed is:

1. A circuit comprising:
a controller that controls a first microactuator to cause a first head to follow a track on a first disk surface while controlling a second microactuator to conditionally and radially offset a second head away from a track on a second disk surface responsive to data that identifies locations of thermal asperities on the second disk surface.

2. The circuit of claim 1, wherein the controller controls the second microactuator to conditionally offset the second head away from particular sectors of the track on the second disk surface responsive to data that identifies that thermal asperities are located in those particular sectors of the track.

3. The circuit of claim 1, wherein the controller controls the second microactuator to conditionally offset the second head away from the entire track on the second disk surface responsive to data that identifies that a thermal asperity is located on the track on the second disk surface.

4. The circuit of claim 1, wherein the controller controls movement of the first and second heads relative to the first and second disk surfaces on opposite sides of the same disk.

5. The circuit of claim 1, wherein the controller controls movement of the first and second heads relative to the first and second disk surfaces on different disks.

6. The circuit of claim 1, wherein the controller controls the second microactuator to offset the second head at least one radial track spacing away from the track on the second disk surface to avoid the second head colliding with thermal asperities.

7. The circuit of claim 6, wherein the controller provides a first control signal to the first microactuator that is at least primarily within a non-saturated range of operation, and conditionally provides a second control signal to the second microactuator that is at least primarily within a saturated range of operation responsive to data that identifies locations of thermal asperities on the second disk surface.

8. The circuit of claim 1, wherein the controller controls third and fourth microactuators to conditionally offset third and fourth heads, respectively, away from tracks on third and fourth disk surfaces responsive to data that identifies locations of thermal asperities on the third and fourth disk surfaces.

9. The circuit of claim 1, wherein the first and second microactuators comprise piezoelectric actuators.

10. The circuit of claim 1, further comprising:
first and second digital-to-analog converters; and
first and second amplifiers,
wherein the controller generates first and second control signals, the first digital-to-analog converter converts the first control signal into a first analog signal that is amplified by the first amplifier and supplied to the first microactuator to regulate movement of the first head, and the second digital-to-analog converter converts the second control signal into a second analog signal that is amplified by the second amplifier and supplied to the second microactuator to regulate movement of the second head.

11. The circuit of claim 10, further comprising:
N microactuators that move N heads connected thereto;
N digital-to-analog converters; and
N amplifiers,
wherein N is a natural number, the controller generates N control signals, the N digital-to-analog converters convert corresponding ones of the control signals into analog signals that are amplified by corresponding ones of the N amplifiers and supplied to corresponding ones of the N microactuators to regulate movement of the N heads.

12. The circuit of claim 1, wherein the controller comprises:
a thermal asperity avoidance control unit that biases the second microactuator to cause the second head to be offset away from the track on the second disk surface responsive to data that identifies that a thermal asperity is located along the track on the second disk surface.

13. The circuit of claim 12, wherein the thermal asperity avoidance control unit biases the second microactuator to cause the second head to be offset away from sectors along the track on the second disk surface that are identified by the data as having thermal asperities, and ceases biasing the second microactuator to allow the second head to at least partially overlap sectors on the track on the second disk surface that are not identified by the data as having thermal asperities.

14. A circuit comprising:
a memory for storing thermal asperity data that identifies sectors of tracks on a disk surface that contain thermal asperities; and
a controller that responds to the thermal asperity data by controlling a microactuator to conditionally and radially offset a head away from the identified sectors of tracks to avoid contact between the head and the thermal asperities.

15. The circuit of claim 14, wherein the controller controls the microactuator to cause the head to at least partially overlap particular sectors of a selected track in response to the thermal asperity data not identifying thermal asperities in the particular sectors of the selected track, and controls the microactuator to cause the head to be offset away from the particular sectors of the selected track in response to the thermal asperity data identifying thermal asperities in the particular sectors of the selected track.

16. The circuit of claim 14, wherein the controller controls the microactuator to offset the head at least one radial track spacing away from particular sectors of the selected track that are identified by the thermal asperity data as having thermal asperities.

17. A method comprising:
controlling a first microactuator to cause a first head to follow a track on a first disk surface; and
simultaneously controlling a second microactuator to conditionally and radially offset a second head away from a track on a second disk surface responsive to data that identifies locations of thermal asperities on the second disk surface.

18. The method of claim 17, further comprising:
while controlling the first microactuator to cause the first head to follow the track, controlling the second microactuator to conditionally offset the second head away from particular sectors of the track on the second disk surface responsive to data that identifies that thermal asperities are located in those particular sectors of the track.

19. The method of claim 17, further comprising:
ceasing control of the second microactuator to allow the second head to at least partially overlap other sectors of the track on the second disk surface in response to the data not identifying thermal asperities in those other sectors of the track.

* * * * *